(12) United States Patent
Bynum

(10) Patent No.: US 11,753,253 B1
(45) Date of Patent: Sep. 12, 2023

(54) FEEDER ASSEMBLY FOR DELIVERING MATERIAL TO A MAIN BOOM ASSEMBLY

(71) Applicant: Walter Bynum, Palm City, FL (US)

(72) Inventor: Walter Bynum, Palm City, FL (US)

( * ) Notice: Subject to any disclaimer, the term of this patent is extended or adjusted under 35 U.S.C. 154(b) by 0 days.

(21) Appl. No.: 18/089,960

(22) Filed: Dec. 28, 2022

(51) Int. Cl.
| | |
|---|---|
| *B65G 15/14* | (2006.01) |
| *B65G 15/26* | (2006.01) |
| *B65G 41/00* | (2006.01) |

(52) U.S. Cl.
CPC ........ *B65G 41/005* (2013.01); *B65G 2201/04* (2013.01)

(58) Field of Classification Search
CPC ...... B65G 15/14; B65G 15/26; B65G 41/005; B65G 2201/04
USPC .................. 198/313; 414/502, 503, 504, 505
See application file for complete search history.

(56) References Cited

U.S. PATENT DOCUMENTS

| | | | |
|---|---|---|---|
| 3,151,732 A | 10/1964 | Oury et al. | |
| 3,675,762 A * | 7/1972 | Arndt | E04G 21/04 198/588 |
| 4,624,357 A | 11/1986 | Oury et al. | |
| 4,646,906 A | 3/1987 | Wilcox, Jr. | |
| 4,874,283 A * | 10/1989 | Hurley, Jr. | E01C 19/182 404/108 |
| 5,634,545 A | 6/1997 | Plumley | |
| 6,378,686 B1 | 4/2002 | Mayer | |
| 6,431,346 B1 | 8/2002 | Gilmore et al. | |
| 6,471,031 B1 | 10/2002 | Duncalf | |
| 7,108,125 B2 | 9/2006 | Gilmore et al. | |
| 8,985,301 B2 | 3/2015 | Werlinger | |
| 9,410,334 B2 * | 8/2016 | Fügel | B66C 23/80 |
| 9,580,874 B2 * | 2/2017 | Millsaps, II | B65G 41/002 |
| 9,828,184 B1 | 11/2017 | Bynum | |
| 9,969,558 B1 | 5/2018 | Bynum | |
| 10,196,215 B2 | 2/2019 | Buckmeier et al. | |
| 10,399,785 B1 * | 9/2019 | Fike | B65G 41/002 |
| 10,518,982 B1 | 12/2019 | Fike et al. | |
| 10,611,345 B2 * | 4/2020 | Maini | B66C 23/80 |
| 10,717,601 B2 * | 7/2020 | Kornelsen | B65G 15/24 |
| 11,187,001 B1 * | 11/2021 | Bynum | B65G 47/44 |
| 2010/0135758 A1 | 6/2010 | Gallione et al. | |
| 2013/0118862 A1 | 5/2013 | Stewart | |
| 2019/0210807 A1 | 7/2019 | Kornelsen et al. | |

FOREIGN PATENT DOCUMENTS

GB  2 246 997  *  8/1991

* cited by examiner

*Primary Examiner* — Douglas A Hess
(74) *Attorney, Agent, or Firm* — The Concept Law Group, PA; Scott M. Garrett; Scott D. Smiley

(57) ABSTRACT

A feeder assembly can be mounted on a platform such as a transport vehicle that includes a main boom assembly for moving material at a destination site. The main boom assembly is both telescoping and rotatable about a rotatable mount on the platform. The feeder assembly is mounted on the platform and can be raised from a transport position in which the feeder assembly lays horizontally on the platform, adjacent the rotatable mount, to a raised and angled position that allows the feeder assembly to convey construction material from a feed hopper at the rear of the feeder assembly to a feed point of the main boom assembly.

17 Claims, 10 Drawing Sheets

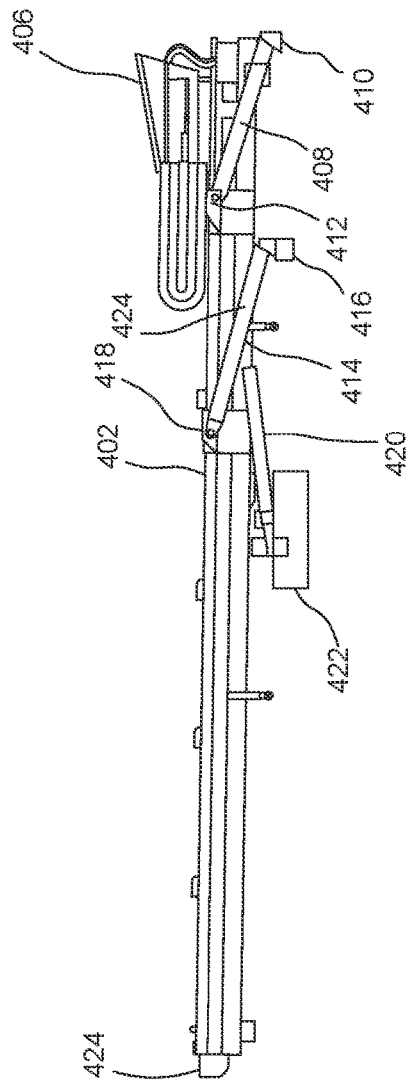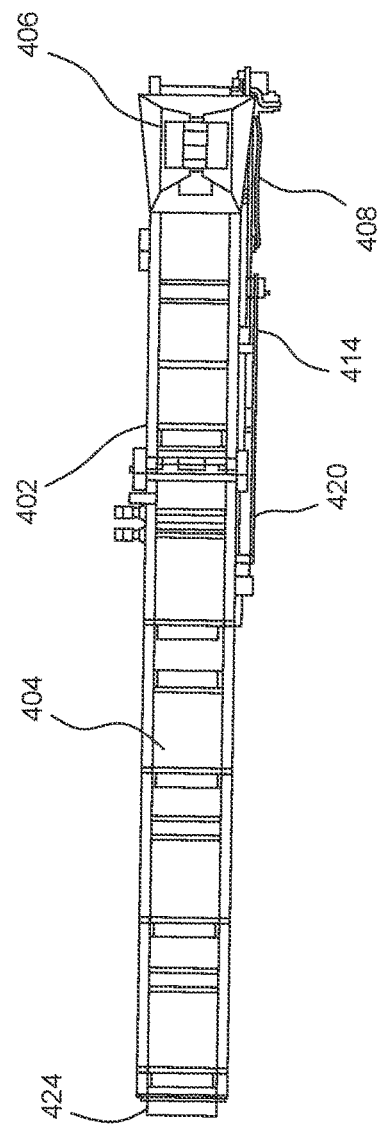
FIG.4A
FIG.4B

FEEDER ASSEMBLY FOR DELIVERING MATERIAL TO A MAIN BOOM ASSEMBLY

FIELD OF THE INVENTION

The present invention relates generally to a feed system for a portable construction material boom assembly, and, more particularly, relates to a feeder conveyor, and which is moveable between a horizontal transport position in the truck and an angled operating position in which it is capable of feeding material to the boom assembly for delivery to a construction location.

BACKGROUND OF THE INVENTION

An essential aspect in many industries is the movement of material. For example, in the construction of buildings, parking garages, and other structures, concrete is moved typically from a truck to the placement site. In other industries various materials may need to be similarly moved from one location to another. Often material is transported by a truck. Using concrete as an example, concrete is moved by a concrete mixing truck to a construction site where it is pumped to a placement or installation location. Alternatively, concrete may also be mixed at the construction site and pumped to the placement location. To deliver the concrete to the desired location, it is pumped through a pipeline. As a result, the concrete is under high pressure, which has the potential to cause accidents, and does in some cases.

To convey the concrete to the placement location while at a construction site, some known assemblies, such as those commercially sold by the company, Putzmeister, utilize a trailer or truck having multiple extendable and articulating boom sections acting as a frame for a conduit or piping carrying the concrete to a placement location. These multiple extendable boom sections are sometimes referred to as a "main conveyor" or "boom pipeline." To get the concrete to the boom pipeline, these assemblies utilize a pumping system to transport the concrete to the placement location from a truck, typically. These boom sections are pivotally coupled with respect to one another and are operable to have a single degree of freedom with respect to a single joint in which two individual boom sections are coupled. Over the length of the boom pipeline, the multiple boom sections combine to have multiple degrees of freedom, yet they are still problematically limited to a single access of movement, i.e., vertically, with respect to one another. As such, to navigate to the boom pipeline horizontally the entire boom pipeline is required to be rotated with respect to the base of boom pipeline and the trailer/truck (hereinafter "boom pipeline turret"). This presents multiple problems to users having concrete placement locations within tight and/or compact confines and/or construction sites where power and/or telephone lines are present. Readjusting the length or position of the boom pipeline, whether it be by horizontal movement about the boom pipeline turret or by pivoting individual boom sections with respect to one another, can also be a cost-, time-, and/or labor-intensive endeavor.

These above-described conduit-based pumping systems are also problematic in that they require specific concrete mixtures in order for the concrete to flow through the conduit, unlike telescopic booms utilizing belt conveyors such as those commercially marketed by Putzmetizer under the trademark Telebelt and as described in U.S. Pat. Nos. 4,624,357, 6,431,346, 8,662,291 (wherein the entirety of said descriptions are incorporated herein by reference).

Moreover, those conduit-based pumping systems are also problematic in that they generally require more power to operate and, should the pump break and/or malfunction, also typically require the entire conduit to be replaced. Furthermore, there are significant safety issues associated with pumping systems as they can become over-pressurized, or acquire an air bubble in the line, and generate a condition called "hose whip" where the terminal end of the delivery system violently whips in response to the sudden, explosive release of pressurized air. This has caused numerous injuries and fatalities. Furthermore, there is considerable waste in pump systems as the concrete in the pipeline that is not dispensed needs to be washed out of the pipeline.

Many of the known belt conveyors also present problems to users because they too require rotation of the main conveyor at the main conveyor base joint to place and/or deliver the concrete to the user and/or maneuver the end hose attached to the distal end of the main conveyor. Moreover, those known telescopic belt conveyors telescope the main conveyor by extending and retracting a plurality of boom sections within one another. Therefore, vertical adjustment of one or more of the main boom sections is unavailable unless the user vertically adjusts the main conveyor about the main conveyor base joint, which can cost- and time-intensive. Another problem with belt conveyor systems is that they require the boom sections to somewhat coplanar. The boom sections can rotate in a plane with respect to each other, but not change angles. However, in the delivery of concrete using a flat belt system, the boom section having the flat belt should be horizontal, otherwise the concrete will flow along the belt due to gravity.

Another problem with existing conveyor systems is that it has been found that having the distal boom section at an angle (i.e. not level) while delivering concrete raises the point of placement apparatus at the end of the distal section, such that the concrete being carried on the distal boom section is raised above the desired point of placement and the discharge hose will be too high to place the material.

Accordingly, freedom of movement is very desirable in the placement of concrete and other construction materials. One portion of the system than can limit freedom of movement of the main boom assembly is the feeder assembly. The feeder assembly receives construction material, and transports it to a feed point of the main boom assembly, and deposits the construction material onto the main boom assembly. By placing a feeder assembly next to the main boom assembly, the degree of rotation of the main boom assembly is restricted due to the interference with the feeder assembly or feed system.

Therefore, a need exists to overcome the problems with the prior art as discussed above.

SUMMARY OF THE INVENTION

In accordance with some embodiments of the inventive disclosure, there is provided a feeder system for a portable construction material main boom assembly that includes a feeder assembly disposed on a platform having a platform in which a rotatable mount for the main boom assembly is located. The feeder system includes a dispensing end and a receiving end, and is positioned proximate to the rotatable mount. The receiving end is opposite the dispensing end along a length of the feeder conveyor assembly. The feeder system also includes a feeder belt that traverses the feeder conveyor assembly from the receiving end to the dispensing end along a top of the feeder conveyor assembly. The feeder system also includes a lifting mount coupled to the feeder assembly and the platform that is operable to move the feeder assembly from a horizontal transport position in the platform to a deployed position in which the feeder assembly is raised over the platform and angled such that the dispensing end is positioned over a feed point over the main boom assembly. In the deployed position the receiving end is positioned lower than the dispensing end at a rear of the platform.

In accordance with a further feature, the feeder assembly includes a dispensing section and a main section in a telescoping arrangement such that the dispensing section is operable to extend from, and retract into the main section, the dispensing end being at a distal portion of the dispensing section.

In accordance with a further feature, the feeder assembly further includes a transfer chute positioned at the dispensing end that is configured to direct construction material from the feeder belt to the feed point.

In accordance with a further feature, the feeder assembly further includes a hopper at the receiving end, wherein the receiving end is moveable relative to the dispensing end.

In accordance with a further feature, the lifting mount includes a pair of rearward support struts that are each coupled between rearward platform pivot mounts in the bed, and rearward feeder pivot mounts on a primary section of the feeder assembly. The lifting mount further includes a pair of forward support struts that are each coupled between forward platform pivot mounts in the bed, and forward feeder pivot mounts on the primary section of the feeder assembly. The forward support struts are mounted forward of the rearward support struts, and have a longer length than a length of the rearward support struts.

In accordance with a further feature, the feeder assembly also includes an actuator that is operable to move the feeder assembly between the transport position and the deployed position.

In accordance with some embodiments of the inventive disclosure, there is provided a feeder system for a portable construction material main boom assembly that includes a feeder assembly disposed in a platform of a transport vehicle in which a rotatable mount for the main boom assembly is located. The feeder assembly includes a main section, a dispensing end that is positioned proximate to the rotatable mount and which is extendable from the main section in a direction towards the rotatable mount, and a receiving end that is opposite the dispensing end along a length of the feeder conveyor assembly. The receiving end is extendable from the main section in a direction away from the rotatable mount. The feeder system also includes a feeder belt that traverses the feeder conveyor assembly from the receiving end to the dispensing end along a top of the feeder conveyor assembly. The feeder system further includes a lifting mount coupled to the feeder assembly and the platform that is operable to move the feeder assembly from a horizontal transport position in the platform to a deployed position in which the feeder assembly is raised over the body and angled such that the dispensing end is positioned over a feed point over the main boom assembly, and also the receiving end is positioned lower than the dispensing end at a rear of the platform.

In accordance with some embodiments of the inventive disclosure, there is provided a mobile boom system for placement of construction material at a work site that includes a platform having a platform which includes a recess. The mobile boom system also includes a main boom assembly mounted on a rotatable mount that is mounted on the platform, and a feeder assembly disposed on the platform. The feeder assembly includes a dispensing end and a receiving end. The dispensing end is positioned proximate to the rotatable mount, and the receiving end is opposite the dispensing end along a length of the feeder conveyor assembly. The feeder assembly also includes a feeder belt that traverses the feeder conveyor assembly from the receiving end to the dispensing end along a top of the feeder conveyor assembly. The feeder assembly further includes a lifting mount coupled between and to both the feeder assembly and the platform. The lifting mount is operable to move the feeder assembly from a horizontal transport position in the recess of the platform to a deployed position in which the feeder assembly is raised over the platform and angled such that the dispensing end is positioned over a feed point over the main boom assembly and the receiving end is positioned lower than the dispensing end and at a rear of the platform.

Although the invention is illustrated and described herein as embodied in a mobile boom system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the article or element being referenced. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIGS. 4A and 4B show a side view and a top view of the feeder assembly in the transport position, removed from the transport vehicle bed, in accordance with some embodiments;

DETAILED DESCRIPTION

Figure 1:
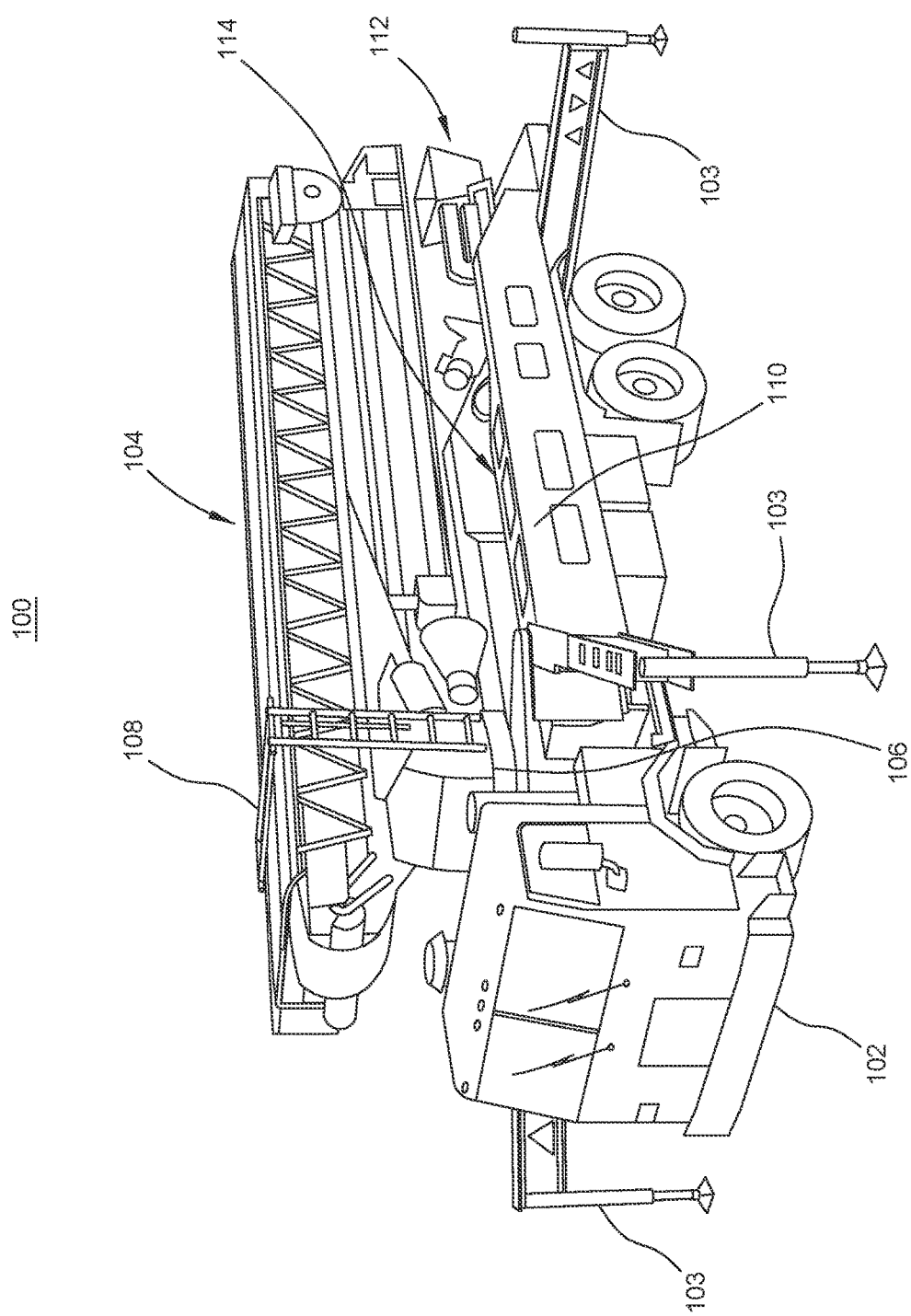
FIG. 1 shows a perspective view of portable construction material placement system that includes a main boom assembly and a feeder assembly, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The embodiments disclosed herein relate to a feeder assembly for moving material from a source to a conveyor that then moves the material to a destination. In some embodiments the material can be construction materials such concrete. In some embodiments the material can be other types of material, such as, for example, grain, fertilizer, scrap material, and so on. While the subsequent description often uses construction material as an example, it will be readily apparent to those of skill in the art that the disclosed feeder assembly can be used for a variety of materials equivalently.

FIG. 1 shows a perspective view of portable construction material placement system 100 that includes a main boom assembly 104 and a feeder assembly 112, in accordance with some embodiments. Both the main boom assembly 104 and the feeder assembly 112 are show here in their transport positions, and they are mounted in the bed 110 a transport vehicle 102, thus the main boom assembly 104 can be a portable main boom assembly. The bed of the transport vehicle 102 is a platform on which the feeder assembly 112 can be mounted. Other platforms that can equivalently host a feeder assembly can include a vehicle frame, a barge, a crane, a trailer, and so on. In the particular example here, the main boom assembly 104 is mounted to a rotatable mount 106 that allows the main boom assembly 104 to be rotated about the rotatable mount 106, and which is mounted on the platform (e.g. transport vehicle 102). The main boom assembly 104 can be a telescoping boom assembly with a rotatable distal section, and having a feed point 108 that is directly over the rotatable mount 106. In that way, material can be delivered to the main boom assembly at the feed point without regard to its rotational orientation, or even while the main boom assembly 104 is rotating. In the present example, the rotatable mount 106 is positioned near the forward end of the bed 110 of the transport vehicle 102, and, in the transport position, the main boom assembly 104 is positioned over the bed 110, and over the feeder assembly 112, which is disposed in a channel 114 in the bed. The channel 114 runs along the length of the bed (i.e. from back to front). While the main boom assembly 104 and the feeder assembly 112 are in their respective transport positions, the stabilizer legs 103 have been deployed to ready the transport vehicle for deployment of the main boom assembly 104 and the feeder assembly 112 for the placement of construction material.

Figure 2:
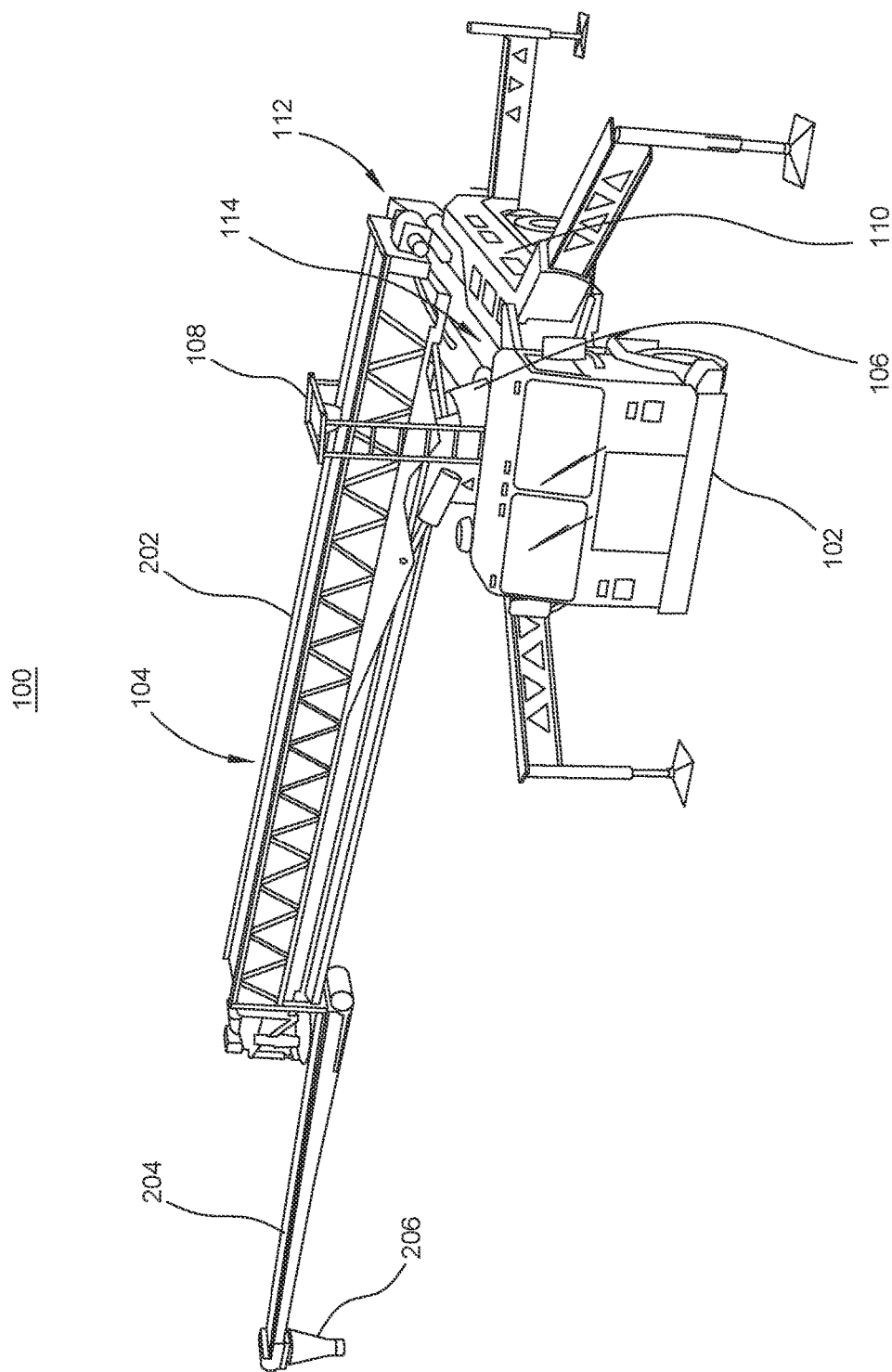
FIG. 2 shows a front view of the portable construction material placement system with the main boom assembly partially extended, and the feeder assembly in transport position in the bed of the vehicle, in accordance with some embodiments.
Figure 3:
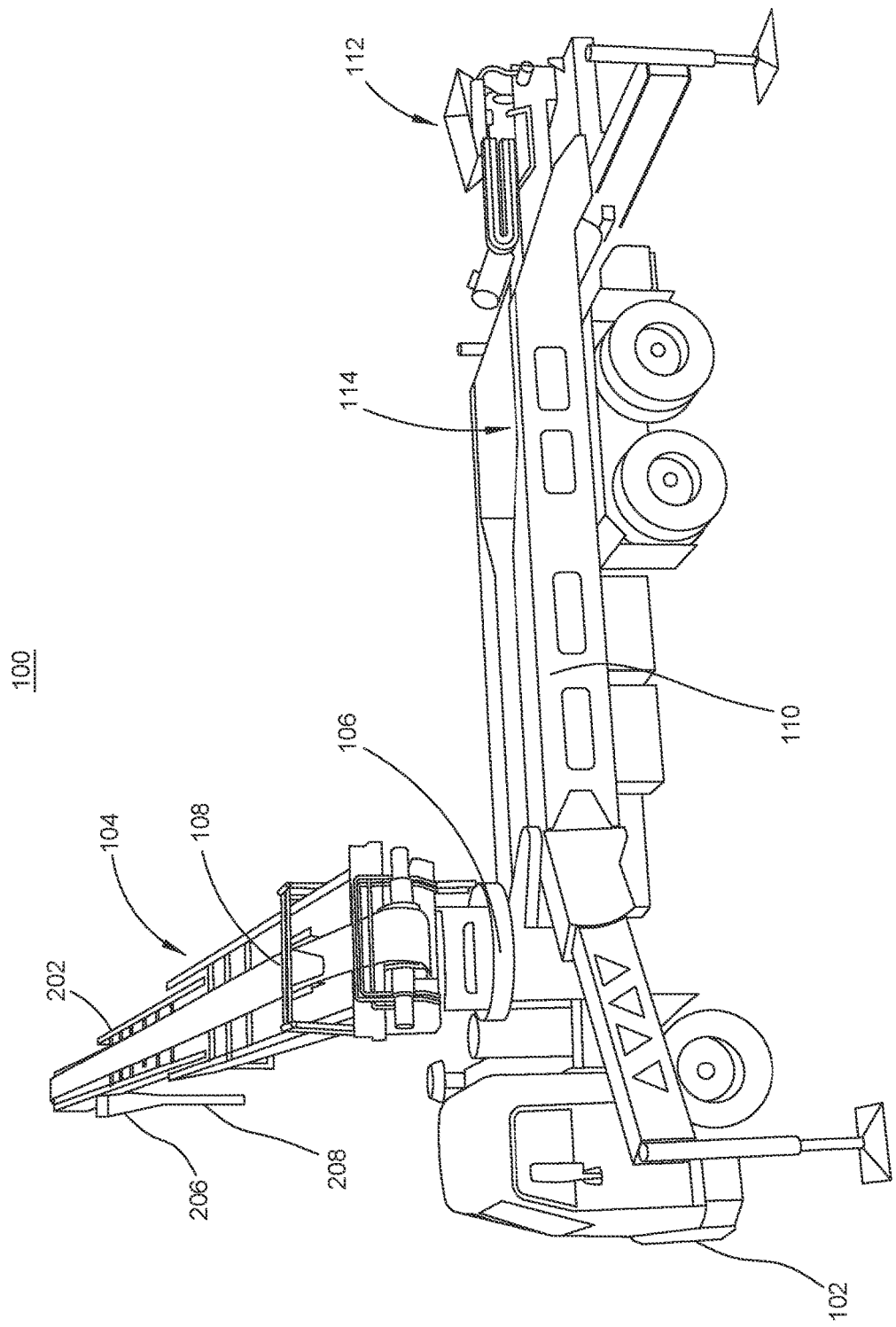
FIG. 3 shows a side view of the portable construction material placement system with the main boom assembly partially extended, and the feeder assembly in transport position in the bed of the vehicle, in accordance with some embodiments.

FIGS. 2 and 3 show a front view and a side view, respectively, of the portable construction material placement system 100 with the main boom assembly 104 partially extended, and the feeder assembly 112 still in its transport position in the bed 110 of the transport vehicle 102, in accordance with some embodiments. In this position the distal section 204 of the main boom assembly has been rotated out from the telescoping boom section 202. A transfer chute 206 at the end of the distal section direct construction material from a conveyor belt on the distal section to a placement location. The construction material is to be fed into a hopper (shown raised here) at the feed point 108, where the construction material will be deposited on a conveyor belt of the telescoping boom section 202. Construction material delivered to the telescoping boom section 202 is conveyed to an intermediate chute, through which it is then delivered onto the conveyor belt of the distal section 204, and then through the transfer chute 206 at the remote end of the distal boom section 204. A vertical delivery tube 208 is connected to the transfer chute 206 to help direct the construction material to the desired placement location.

FIGS. 4A and 4B show a side view and a top view, respectively, of the feeder assembly in the transport position, abstracted from the transport vehicle bed, in accordance with some embodiments. By "abstracted" it is meant that the structure of the transport vehicle and the other components of the system are removed from view to show only the feeder assembly 112. The feeder assembly 112 includes a primary feeder section 402 and an extendible feeder section 404 that is mounted in a telescoping relationship with the primary feeder section 402. A conveyor belt is routed over these section 402, 404 to carry construction material from a feed hopper 406 to a feed chute 424 at the dispensing end of the feeder assembly. Further, the feed hopper 406 is mounted on a mount that moves along the main section 402 in a similar telescoping manner to allow positioning of the feed hopper 406 at the rear of the feeder assembly 112.

The feeder assembly is attached to the bed of the transport vehicle by support struts 408 and 414. These support struts 408, 414 can be duplicated on the opposite side of the feeder assembly. Rearward support strut 408 is attached at the side of the primary feeder section 402 near the rear of the primary feeder section 402 nearest the feed hopper 406. And specifically, in the example shown here, the rearward support strut 408 is connected between a rearward platform pivot mount 410 that is fixed to the bed of the transport vehicle, and a rearward feeder pivot mount 412 that is fixed to the primary feeder section 402. The forward support strut 414 is coupled to the bed at forward platform pivot mount 416. Both pivot mounts 410, 416 allow the respective support struts 408, 414 to pivot about the mounts 410, 416 in a vertically oriented plane. Said another way, the support struts 408, 414 can move along an arcuate path around their respective pivot mounts 410, 416. Likewise, the support struts 408, 414 are further attached to the primary section 402 at rearward feeder pivot mount 412 and forward feeder pivot mount 418. From the perspective of the feeder pivot mounts 412, 418, the support struts 408, 414 move in an arcuate path about those mounts 412, 418 as well. An actuator 420 is coupled to an actuator mount 422 in the bed and to the feeder assembly 402. For example, the actuator can be connected to a forward support strut 414. The actuator 420 can be a hydraulic actuator that extends, and thereby pushes the feeder assembly 112 away from the bed, or lowers it into the bed. Forward support strut 414 is longer than the rearward support strut 408, and as a result, when the feeder assembly 112 is raised, it will be at an angle.

Figure 5:
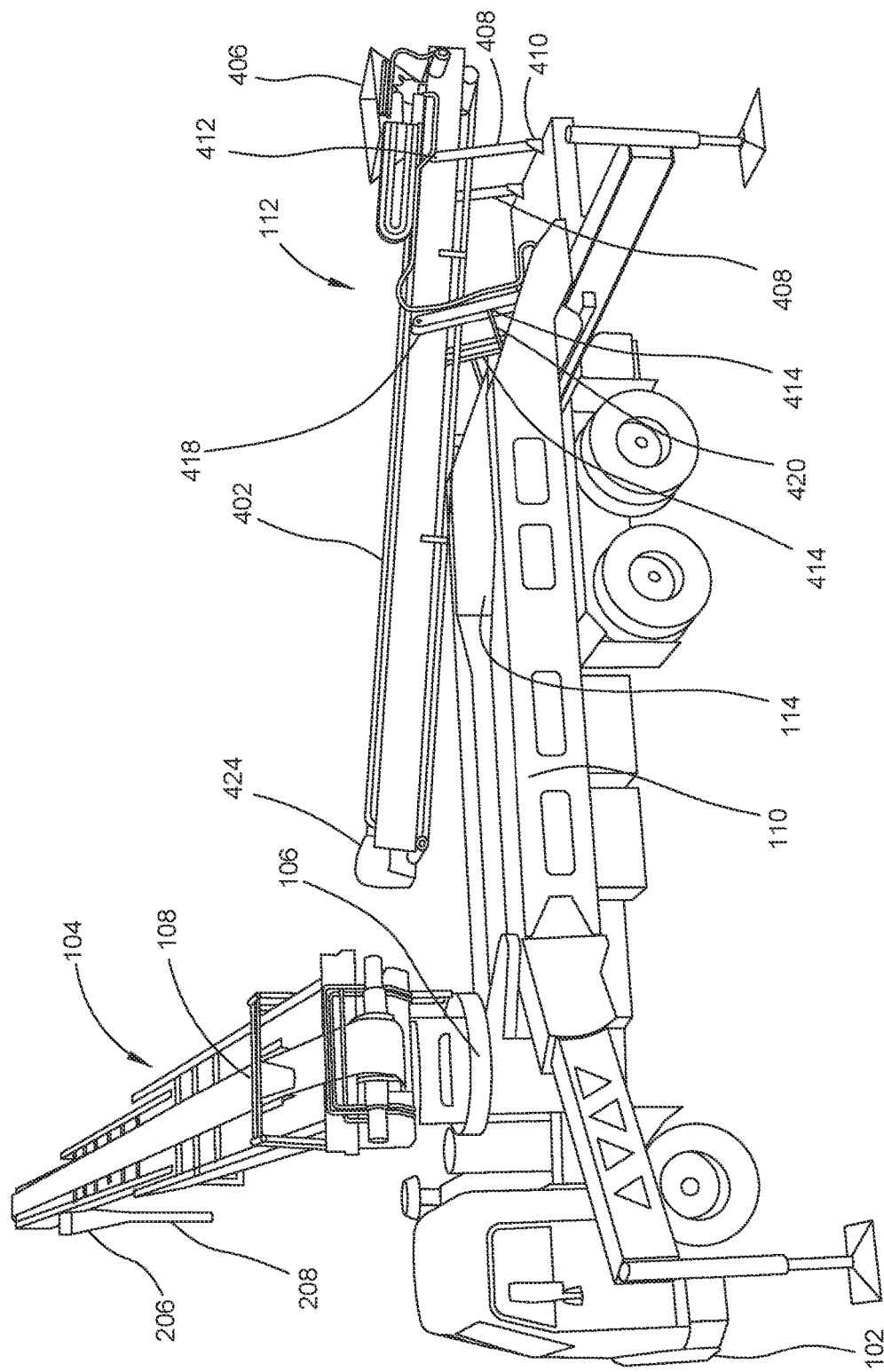
FIG. 5 shows a side view of the transport vehicle with main boom assembly extended, and the feeder assembly in an intermediate position after being partially raised from the transport position, in accordance with some embodiments.
Figure 6:
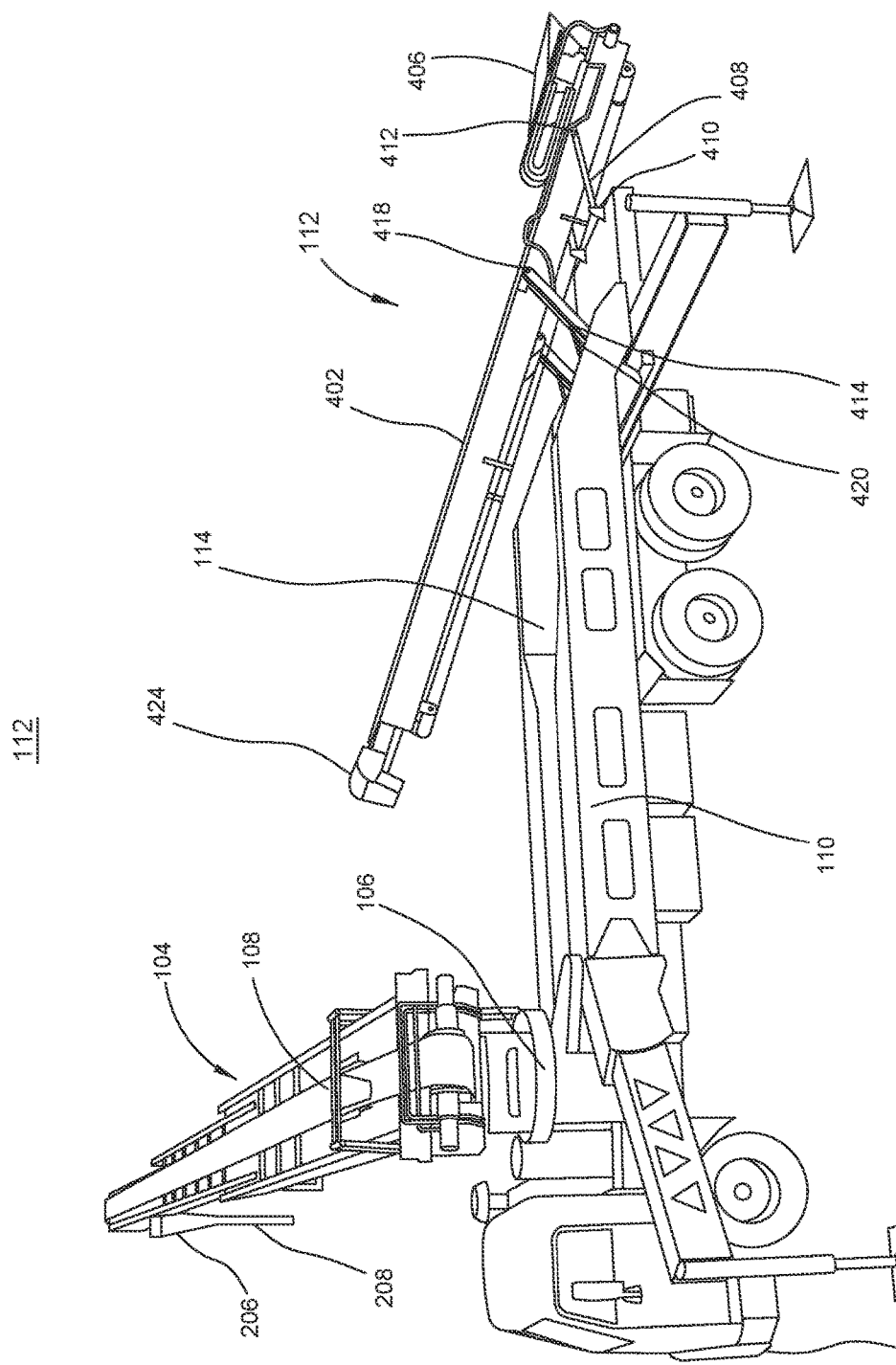
FIG. 6 shows a side view of the transport vehicle with main boom assembly extended, and the feeder assembly in a fully raised position after being partially raised from the transport position, in accordance with some embodiments.
Figure 7:
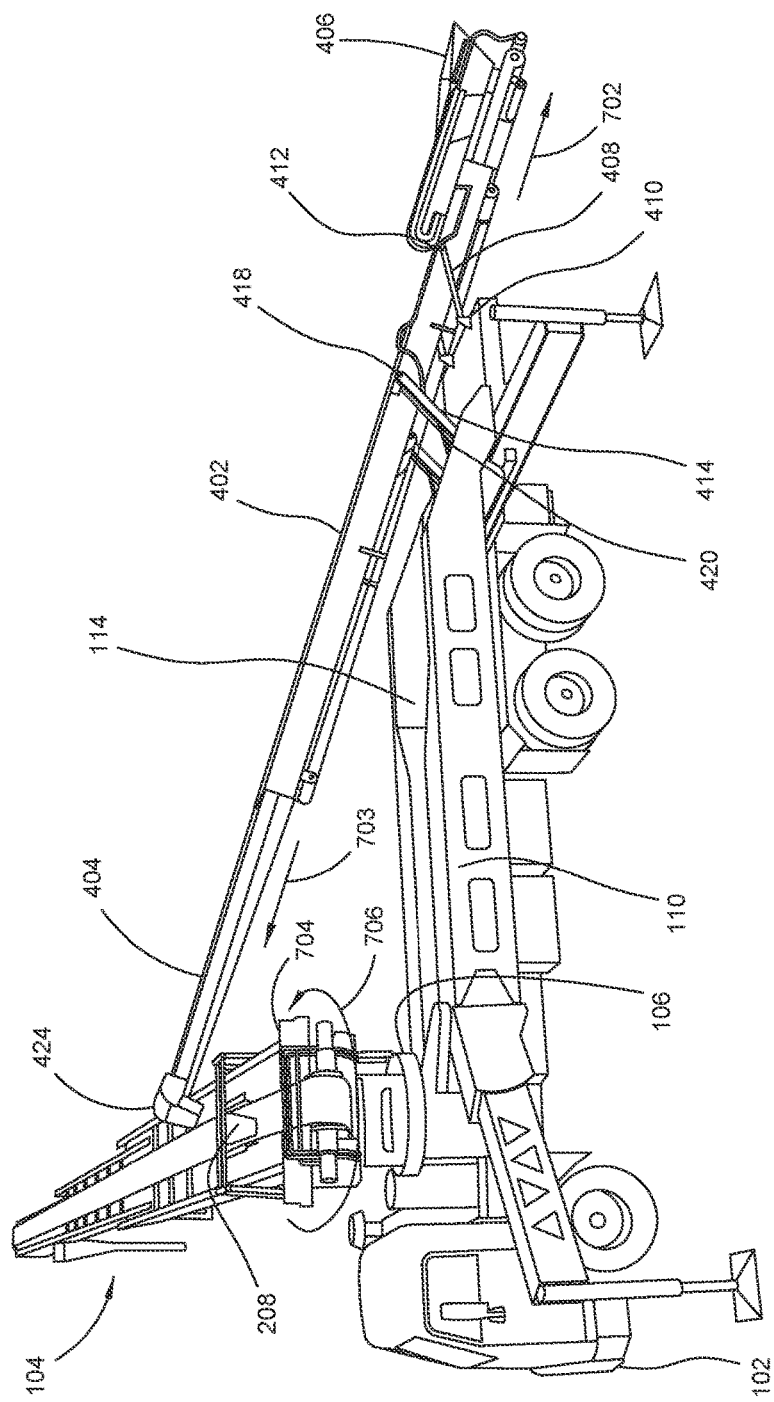
FIG. 7 shows a side view of the transport vehicle with main boom assembly extended, and the feeder assembly in a fully raised position and deployed position to feed construction material to the main boom assembly, in accordance with some embodiments.
Figure 8:
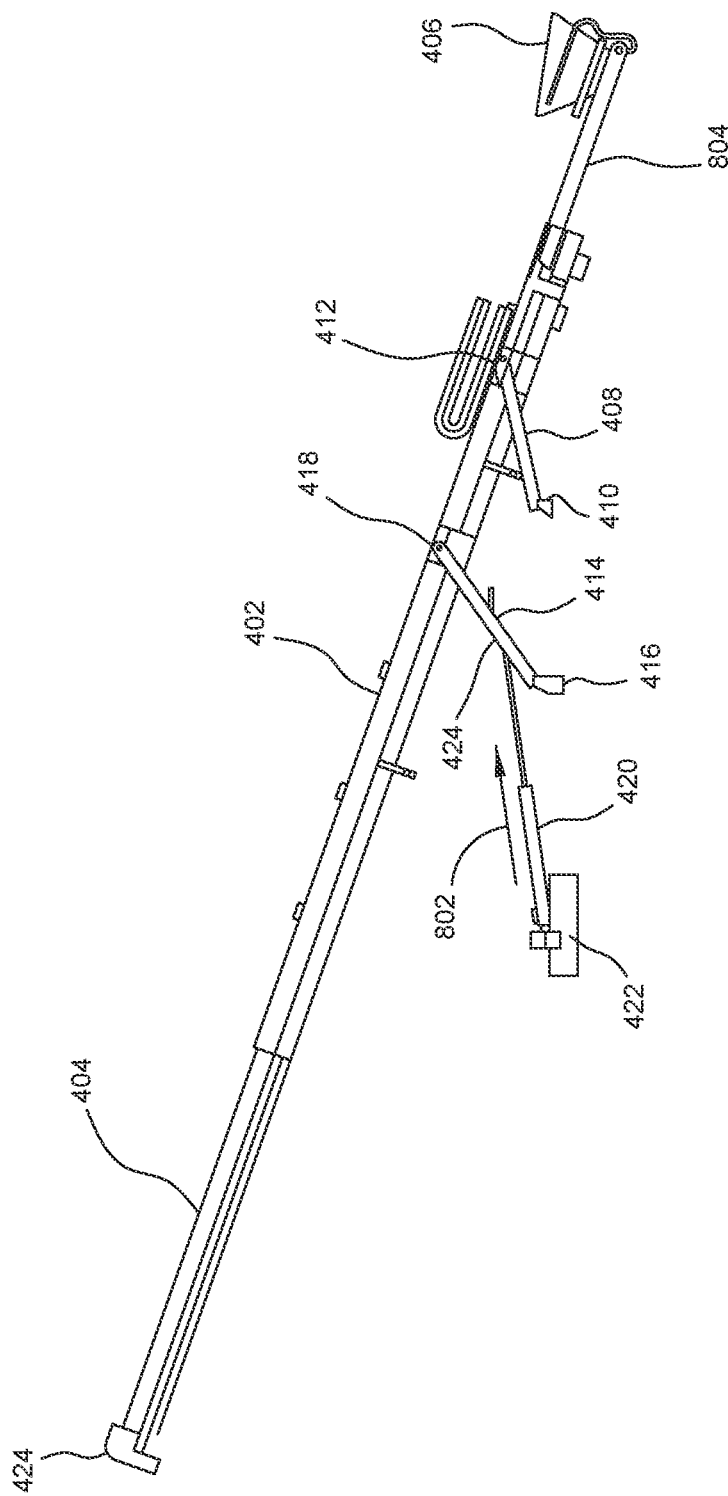
FIG. 8 shows a side view of the feeder assembly, abstracted from the transport vehicle, in a fully raised position and deployed position to feed construction material to the main boom assembly in accordance with some embodiments.

FIGS. 5-7 show the process of raising the feeder assembly 112 from the bed 110 of the transport vehicle 102. FIG. 5 shows a side view of the transport vehicle 102 with main boom assembly 104 extended, and the feeder assembly 112 in an intermediate position after being partially raised from the transport position where the feeder assembly lays horizontally in the bed 110. FIG. 6 shows the feeder assembly 112 in its fully raised position, and FIG. 7 shows the feeder assembly 112 in its fully raised position with the extendible feeder section 404 and the feed hopper 406 positioned in the operating positions, respectively. In these drawings there are a pair of rearward support struts 408 and a pair of forward support struts 414. FIG. 8 shows the feeder assembly 112 as it is in FIG. 7, but abstracted from the transport vehicle 102 and bed 110 so that the details of the support struts 408, 414 can be seen. To raise the feeder assembly 112, the actuator 420 begins extending, pushing on the feeder assembly 112, can causing the support struts 408, 414 to pivot about their respective mounts 410, 412, 416, 418. As the feeder assembly is pushed, as indicated by arrow 802 in FIG. 8, the rearward support struts 408 maintain a fixed distance between rearward bed and feeder mounts 410, 412 at the length of the rearward support strut 408. Likewise, the distance between the forward bed and feeder pivot mounts 416, 418 is likewise maintained at the length of the forward support struts 414. Because the forward support struts 414 are longer than the rearward support struts 408 the main section 402 of the feeder assembly 112 becomes tilted at an angle as the main section 402 is raised and as the rearward and forward support struts 408, 414 rotate about their respective bed pivot mounts 410, 416. The feeder assembly 112 can be mounted in the bed 110 so that it is aligned with the rotatable mount 106, and therefore the feed point 108. That is, the rotatable mount 106 and feeder assembly 112 are arranged such that they are centered on an axis along the feeder assembly 112 that is in the elongated direction of the feeder assembly 112. Once the feeder assembly 112 is raised to its fully raised position, as in FIG. 6, then the extendible section 404 of the feeder assembly is extended, as shown in FIG. 7, as indicated by arrow 703, until the feed chute 424 is directly over the feed point 108. A funnel, hopper or similar component can be used to direct construction material from the feed chute 424 to the conveyor of the main boom assembly 104 at the feed point 108. Similarly, the feed hopper 406 can be extended away from the primary section 402 on a telescoping hopper chassis 804 (as shown in FIG. 8), as indicated by arrow 702. One benefit of positioning the feeder assembly like this is that the lower end 704 of the main boom assembly 104 can pass under the feeder assembly 112 while rotating the main boom assembly (e.g. arrow 706), and during rotation the feed point 108 remains the same. Thus, the dispensing end is configured to direct material from the feeder belt to the feed point 108.

Figure 9:
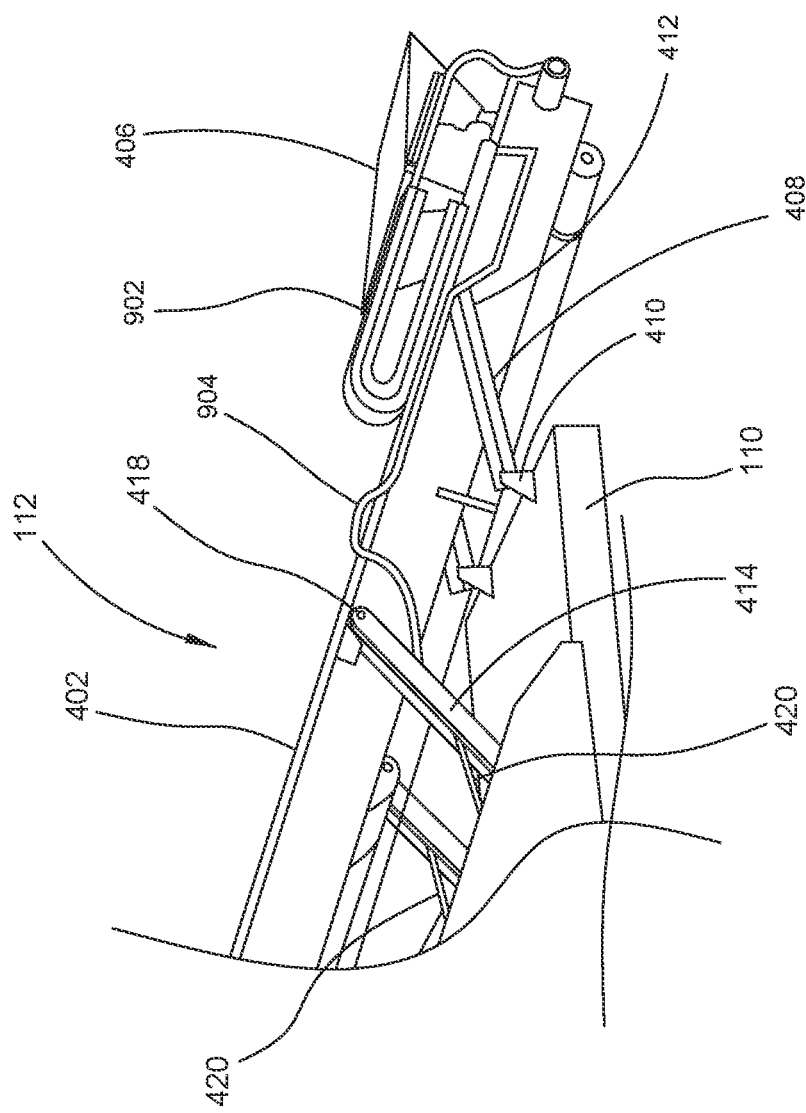
FIG. 9 shows a detail of the receiving end of the feeder assembly and the mounting structure that mounts the feeder assembly to the bed of the transport vehicle, in accordance with some embodiments.

FIG. 9 shows a detail of the receiving end of the feeder assembly 112 and the mounting structure that mounts the feeder assembly to the bed of the transport vehicle, in accordance with some embodiments. In particular, various cables and lines 904 are routed to the belt drive and feed chassis control from the bed to their endpoints on the feeder assembly 112. Controls in the bed allow an operator to control the operation of the feeder assembly, as well as operation of the main boom assembly and the distal section of the main boom assembly. When the feeder assembly is no longer needed, the process of FIG. 5-7 is simply reversed, and the feeder assembly is lowered back into the bed of the transport vehicle or platform carrying the main boom assembly. The platform can be realized in a variety of configurations, including on a vehicle (e.g. a truck), on a crane, or on a barge, as some examples. The main boom assembly and feeder assembly can be deployed on a variety of platforms substantially as described here, and a platform can be a mobile platform.

It will be appreciated by those skilled in the art that other equivalent structures can be used for raising and lowering the feeder assembly. For example, a pair of hydraulic lifts coupled to the primary feeder section could be used, with one extending upwards higher than the other to angle the feeder assembly. In another example the feeder assembly could be raised by a single lift to which the feeder assembly is pivotably coupled, to allow the feeder assembly to pivot, and therefore achieve a desired angle. Other structures will occur to those skilled in the art that allow for the movement of the feeder assembly between a transport position and an operating position without departing from the scope and spirit of the disclosed embodiments.

Figure 10:
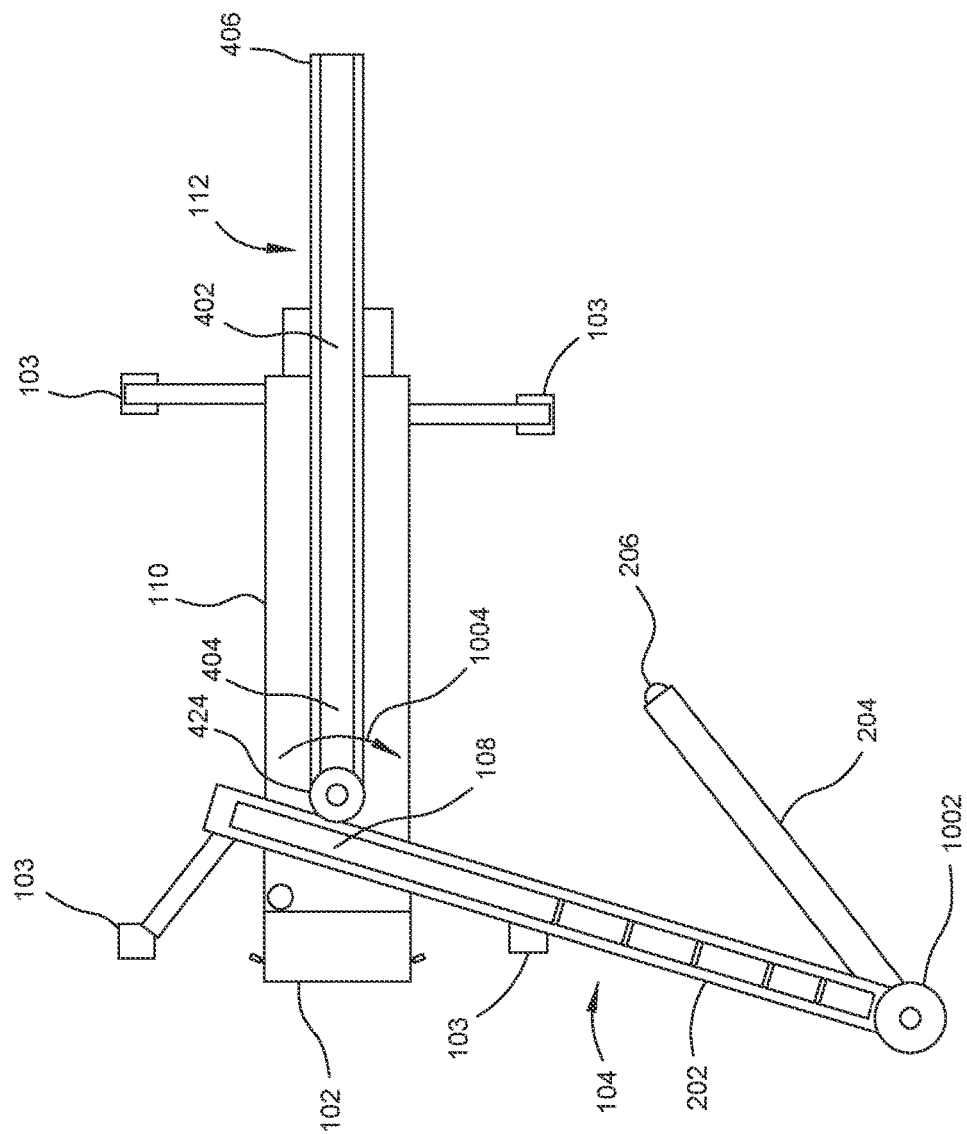
FIG. 10 shows a top view of the transport vehicle with the main boom assembly and feeder assembly deployed to the operation positions for placing construction material, in accordance with some embodiments.

FIG. 10 shows a top view of the transport vehicle 102 with the main boom assembly 104 and feeder assembly 112 deployed to their operation positions for placing construction material. The feed chute 424 is positioned over the feed point 108, and the feed hopper 406 is located at the other end of the feeder assembly 112 where, for example, a truck can load construction material into the feed hopper 406, which directs the construction material to the conveyor belt of the feeder assembly, which carries the construction material to the feed point 108 and then onto the conveyor belt of the main boom assembly. The main boom assembly conveys the construction material to a transfer chute 1002 which directs the construction material to the conveyor belt of the distal section 204, and then to the final chute 206 where it is then placed at the desired location. The main boom assembly 104 can rotate about its rotatable mount, as indicated by arrow 1004. The disclosed configuration allows a large range around the transport vehicle where construction material can be placed. The main boom assembly 104 can be extended or retracted, the distal section 204 can be rotated about the end of the main boom section 104, and the feeder assembly 112, being raised over the main boom assembly 104 allows the end of the main boom assembly 104 to pass under the feeder assembly.

A feeder assembly for a portable construction material placement system has been disclosed that allows the feeder assembly to be transported on the same platform with the main boom assembly. Further, the feeder assembly is easily deployed and then placed back in its transport position when not needed. The feeder assembly facilitates rotation of the main boom assembly by being elevated such that the rear end of the main boom assembly can pass under the feeder assembly, and this provides the system a large degree of freedom for placing construction material.

The claims appended hereto are meant to cover all modifications and changes within the scope and spirit of the present invention.

What is claimed is:

1. A feeder system for a portable main boom assembly, comprising:
 a feeder assembly disposed on a platform in which a rotatable mount for the portable main boom assembly is located, having:
  a dispensing end and a receiving end, the dispensing end being positioned proximate to the rotatable mount, the receiving end being opposite the dispensing end along a length of the feeder assembly;
  a feeder belt that traverses the feeder assembly from the receiving end to the dispensing end along a top of the feeder assembly; and
 a lifting mount coupled to the feeder assembly and the platform that is operable to move the feeder assembly from a transport position in the platform to a deployed position in which the entire feeder assembly is moved relative to the transport position and angled such that the dispensing end is positioned over a feed point over the portable main boom assembly, and the receiving end is positioned lower than the dispensing end at a rear of the platform.

2. The feed system of claim 1, wherein the feeder assembly includes a dispensing section and a main section in a telescoping arrangement such that the dispensing section is operable to extend from, and retract into the main section, the dispensing end being at a distal portion of the dispensing section.

3. The feed system of claim 2, further including a transfer chute positioned at the dispensing end that is configured to direct material from the feeder belt to the feed point.

4. The feed system of claim 1, further comprising a hopper at the receiving end, wherein the hopper is moveable to extend and retract at the receiving end of the feeder assembly.

5. The feed system of claim 1, wherein the lifting mount comprises:
 a pair of rearward support struts that are each coupled between rearward platform pivot mounts in the platform, and rearward feeder pivot mounts on a primary section of the feeder assembly; and
 a pair of forward support struts that are each coupled between forward pivot mounts in the platform, and forward feeder pivot mounts on the primary section of the feeder assembly; and
 wherein each of the pair of forward support struts are mounted forward of the pair of rearward support struts, and have a longer length than a length of the pair of rearward support struts.

6. The feed system of claim 5, further comprising an actuator that is operable to move the feeder assembly between the transport position and the deployed position.

7. A feeder system for a portable main boom assembly, comprising:
 a feeder assembly disposed on a platform in which a rotatable mount for the portable main boom assembly is located, having:
  a primary feeder section;
  an extendible feeder section that is mounted in a telescoping relationship with the primary feeder section and having a dispensing end;
  a receiving end of the primary feeder section that is opposite the extendible feeder section that includes a hopper;
  a feeder belt that traverses the feeder assembly from the receiving end to the dispensing end along a top of the feeder assembly; and
 a lifting mount coupled to the feeder assembly and the platform that is operable to move the feeder assembly from a transport position on the platform to a deployed position in which the entire feeder assembly is moved relative to the transport position and angled such that the dispensing end is positioned over a feed point over the portable main boom assembly when the extendible feeder section is extended, and the receiving end is positioned lower than the dispensing end.

8. The feeder system of claim 7, further including a transfer chute positioned at the dispensing end that is configured to direct material from the feeder belt to the feed point.

9. The feeder system of claim 7, wherein the hopper is moveable along the primary feeder section at the receiving end.

10. The feeder system of claim 7, wherein the lifting mount comprises:
  a pair of rearward support struts that are each coupled between rearward platform pivot mounts on the platform, and rearward feeder pivot mounts on the primary feeder section; and
  a pair of forward support struts that are each coupled between forward platform pivot mounts on the platform, and forward feeder pivot mounts on the primary feeder section; and
  wherein each of the pair of forward support struts are mounted forward of the pair of rearward support struts, and have a longer length than a length of the pair of rearward support struts.

11. The feeder system of claim 10, further comprising an actuator that is operable to move the feeder assembly between the transport position and the deployed position.

12. A mobile boom system for placement of material, comprising:
  a mobile platform;
  a main boom assembly mounted on a rotatable mount, the rotatable mount being mounted on the mobile platform;
  a feeder assembly disposed on the mobile platform and having:
    a dispensing end and a receiving end, the dispensing end being positioned proximate to the rotatable mount, the receiving end being opposite the dispensing end along a length of the feeder assembly;
    a feeder belt that traverses the feeder assembly from the receiving end to the dispensing end along a top of the feeder assembly; and
    a lifting mount coupled between and to both the feeder assembly and the mobile platform, the lifting mount being operable to move the feeder assembly from a transport position on the mobile platform to a deployed position in which the entire feeder assembly is moved relative to the transport position and angled such that the dispensing end is positioned over a feed point over the main boom assembly, and the receiving end is positioned lower than the dispensing end and at a rear of the mobile platform.

13. The mobile boom system of claim 12, wherein the feeder assembly includes a dispensing section and a main section in a telescoping arrangement such that the dispensing section is operable to extend from, and retract into the main section, the dispensing end being at a distal portion of the dispensing section.

14. The mobile boom system of claim 12, further including a transfer chute positioned at the dispensing end that is configured to direct material from the feeder belt to the feed point.

15. The mobile boom system of claim 12, further comprising a hopper at the receiving end, wherein the hopper is moveable along a portion of the receiving end.

16. The mobile boom system of claim 12, wherein the lifting mount comprises:
  a pair of rearward support struts that are each coupled between rearward platform pivot mounts on the mobile platform, and rearward feeder pivot mounts on a primary section of the feeder assembly; and
  a pair of forward support struts that are each coupled between forward platform pivot mounts on the mobile platform, and forward feeder pivot mounts on the primary section of the feeder assembly; and
  wherein each of the pair of forward support struts are mounted forward of the pair of rearward support struts, and have a longer length than a length of the pair of rearward support struts.

17. The mobile boom system of claim 16, further comprising an actuator that is operable to move the feeder assembly between the transport position and the deployed position.

* * * * *